Jan. 24, 1928.
T. L. FAWICK
1,657,008
TRANSMISSION UNIT
Filed Jan. 21, 1922 2 Sheets-Sheet 1
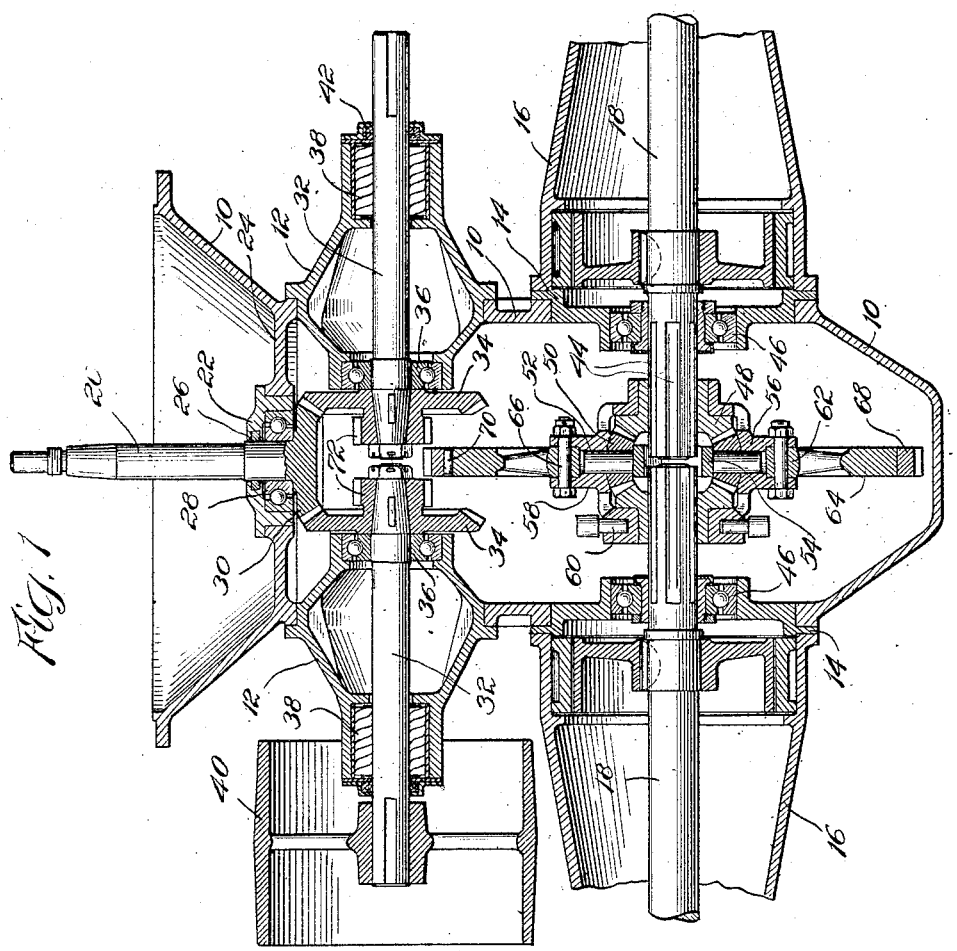

Jan. 24, 1928.
T. L. FAWICK
1,657,008
TRANSMISSION UNIT
Filed Jan. 21, 1922
2 Sheets-Sheet 2
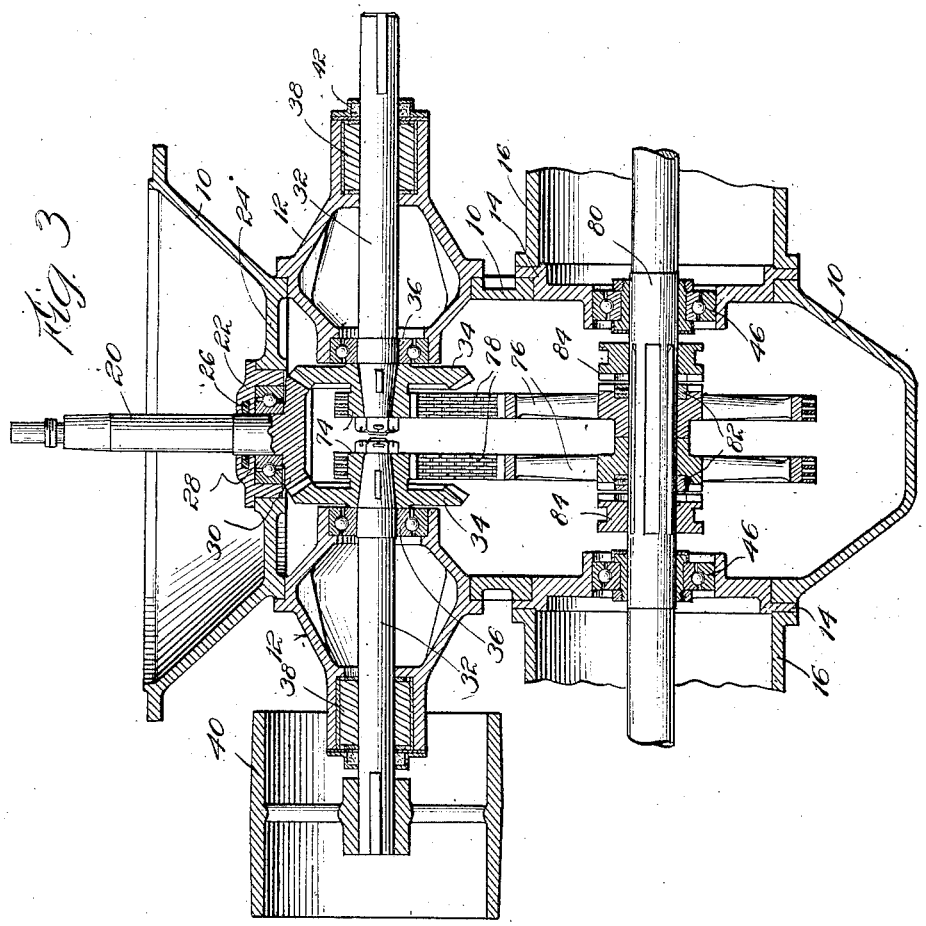
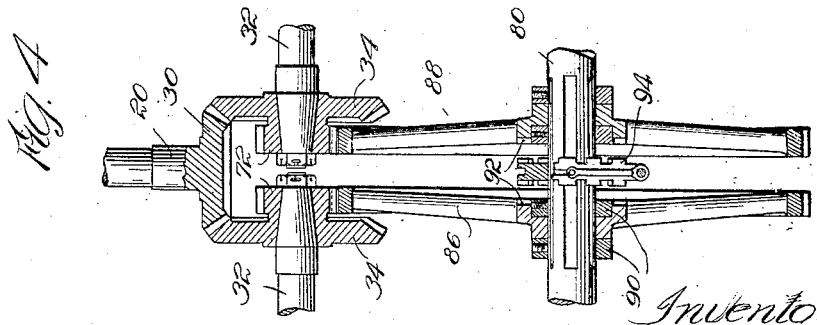
Witness
John E. Titus
Inventor
Thomas L. Fawick
Brown, Boettcher & Dienner
Attys Patented Jan. 24, 1928.

1,657,008

UNITED STATES PATENT OFFICE.

THOMAS L. FAWICK, OF RACINE, WISCONSIN.

TRANSMISSION UNIT.

Application filed January 21, 1922. Serial No. 530,791.

My invention relates to power transmission, and more specifically to an improved transmission unit. While the particular unit illustrated is intended for use in a motor vehicle, of the tractor type, it will be apparent from the following description that many of the features of my invention are not limited to use in connection with motor vehicles.

The primary object of the invention is to simplify and cheapen the structure of a transmission unit capable of performing several different functions, employing duplicate parts as much as possible, and reducing the number of parts by correlating the different sub-combinations so that many elements function as parts of different combinations of elements for performing the various functions involved.

The particular functions performed by the motor vehicle unit illustrated include the transmission of power to the rear axle for moving the vehicle in either direction, and the delivery of power to drive pulleys on one or both sides of the vehicle. I employ very simple and rigid mechanisms for both functions, interacting with each other in such a way as to require a minimum number of additional parts to correlate the two.

A further object is to provide a transmission which works with equal mechanical efficiency in either direction, forward or reverse.

A further object is by a slight modification in dimensions of parts only, to include the additional function of locking the rear wheels together when one wheel loses traction.

Further objects and advantages of the invention will become apparent as the description proceeds.

In the accompanying drawings:

Figure 1 is a sectional view of the improved transmission, and

Fig. 2 is a fragmentary detail of a modification.

Fig. 3 is a section similar to Figure 1 illustrating a silent chain drive to a one-piece rear axle, and Fig. 4 is a direct gear drive to a one-piece rear axle, similarly illustrated.

In the embodiment of my invention selected for illustration, the main housing 10 has two sets of transversely aligned apertures in its sides, one set of apertures receiving duplicate housings 12 extending in opposite directions, and the other set receiving plates 14 co-operating with housings 16 to form enclosures for the rear live axles 18, and parts associated therewith. Power is delivered to the transmission by a drive shaft 20 from any suitable power plant (not shown). Shaft 20 passes through a cover plate 22 supported by an imperforate diaphragm 24, and equipped with a packing 26 for retaining lubricant. The entering end of shaft 20 is supported in ball bearings 28 mounted in cover plate 22, and terminates in a bevel pinion 30.

Aligned pulley drive shafts 32 extending in opposite directions from the center plane of the machine, carry opposed bevel gears 34 meshing continually with pinion 30 to form the well known three-bevel nest. Ball bearings 36 supporting the inner ends of shafts 32 are duplicates of bearings 28, all three bearings being designed to carry the axial thrust exerted by the level gears. Duplicate roller bearings 38 support shafts 32 adjacent their outer ends, which ends project beyond the bearings, and are keyed for mounting a drive pulley 40 thereon. As such units are hardly ever employed to drive two different machines simultaneously, it is customary to put them in service equipped with only one pulley 40, which can readily be mounted on the end of either shaft 32. Lubricant-retaining packings 42 are employed at the outer ends of bearings 38. Packings 42 and 26 not only retain lubricant but seal the interior of the casing against dust and dirt.

It should be noted, that shaft 20 need not, and usually does not lie in the same plane as that containing shafts 32 and 18, the plane of the transverse shafts being usually inclined forward and upward, so that shafts 32 are at a considerably higher level than shafts 18, while shaft 20 extends in the general direction of the power plant, which is usually located in front of, and often slightly below shafts 32.

Shafts 18 project inwardly through duplicate ball bearings 46, and a plurality of keyways are formed in the projecting end of each shaft. Duplicate bevel gears 48, one on each shaft, co-operate with pinions 50, pivoted on pins 52 projecting from a ring 54, to form a differential housed in plates 56 and 58. Plates 56 and 58 are duplicates, except that plate 58 is provided with a groove receiving a ring 60 for sliding the entire differential parallel to the axis of shafts 18. Pins 52 enter sockets formed by plates 56 and 58, and the inner ring 62 of a cast spider acts as a spacer between the plates, which are bolted thereto as at 66. On the outer ring 64, an annular gear 68 is first shrunk and then keyed against rotation by rivets 70.

Permanently associated and preferably integral with each bevel gear 34 is a spur pinion 72. The axial space between pinions 72 is a trifle greater than the thickness of gear 68. It will be obvious that by sliding the differential laterally in either direction from the position shown in the drawings, gear 68 may be brought into mesh with either pinion 72 to drive the rear axle selectively in either direction.

Referring to Fig. 2, it will be obvious that by lengthening the tooth face of pinion 72, as shown at 72′, and slightly increasing the clearance at the outer ends of the differential, sufficient movement may be obtained to slide either splined bevel gear 48 into operative engagement with the keyways on both shafts 18. This will temporarily lock the shafts together, which is frequently useful in case the vehicle gets into a mud hole with one rear wheel.

In Figures 3 and 4 two other modifications are illustrated, each believed to be within the scope of the present invention, and not necessarily dependent on the other. Gears 72 are replaced by sprockets 74 driving large sprockets 76 on the rear axle by silent chains 78. Sprockets 76 rotate freely on rear axle 80, being restrained against axial movement by abutment with each other and with retaining collars 82. Splined clutches 84 may be shifted selectively into mesh with sprockets 76 by the usual shifting fork (not shown) to drive shaft 80 in either direction. The one-piece rear axle shown is customary in tractors of the caterpillar type, where clutch means between the end of the shaft and the driving wheel are provided and steering is effected by selectively disengaging such clutch means to turn the tractor by supplying it with driving force on one side only.

For a gear drive to a similar one-piece rear axle, I prefer to employ the construction illustrated in Fig. 4 on account of its simplicity. Pinions 72 drive gears 86 and 88 on shaft 80. The gears rotate freely on shaft 80 being restrained against axial movement by suitable collars 90. Clutch 94 is splined on shaft 80 and in the position shown in Fig. 4 transmits no driving force. It may be shifted into mesh with either set of clutch teeth 94 to connect gear 86 or gear 88 to shaft 80 for driving the shaft in either direction.

It will be noted that in all forms of my invention, the forward and reverse transmissions are substantial duplicates of each other, except as to the direction of rotation of certain parts. A vehicle having transmission according to my invention can, therefore, be operated over long periods of time by driving it backward with no greater load on the engine or wear and tear on the transmission than if it were driven forward.

A feature of importance in the above construction is the fact that the slow speed gears are shifted rather than the high speed gears. Since the gears have lower peripheral speeds, it is easier to secure meshing without clashing of the teeth. Better adjustment of the high speed gears can be secured and less wear results.

A further feature is the mounting of all of the bearings in removable plates. It can be seen that none of the bearings is mounted in the frame or casing 10 directly, but through the medium of removable plates or housings. This is highly advantageous in permitting renewal of a bearing at a minimum cost.

Without further elaboration, the foregoing will so fully explain the gist of my invention, that others may, by applying current knowledge, readily adapt the same for use under various conditions of service. It will, for instance, be obvious that in very heavy constructions, additional ball bearings for the inner ends of the shafts 32 may be provided, and that casing 10 might have inwardly projecting sleeves for sliding support of the differential directly instead of through the medium of axles 18. It will also be apparent that either gears 86 and 88 or sprockets 76 might be mounted on the outside of a differential casing similar to that shown in Fig. 1, but not itself slidable on the rear axle. These and other modifications and alterations may readily be made without eliminating features which may properly be said to constitute the essential items of novelty involved, which items are intended to be defined and secured to me by the following claims.

I claim:

1. In a device of the class described, a bevel nest, and a spur gear mounted between the bevels and associated with one of the same, the aligned bevels each having shafts with spaced inner and outer bearings.

2. In a device of the class described, a nest of bevels continuously in mesh, inwardly projecting spur pinions associated with the aligned bevels, and differential means slidable on a parallel spaced axis into mesh with either spur gear.

3. In a device of the class described, a bevel nest, spur pinions connected with the aligned bevels, a differential, a peripheral spur gear on said differential, and means for sliding said differential to bring said gear into mesh with either pinion.

4. In combination, a bevel nest, spur pinions connected with the aligned bevels, and a differential having a ring gear, said ring gear being shiftable into mesh axially with said spur pinions.

5. In a device of the class described, aligned axles, a differential connecting said axles, means for sliding said differential parallel to the axis of said axles, and a plurality of driving means positioned to be engaged selectively by said differential for driving the same in different directions.

6. In a device of the class described, aligned axles, a differential having axle engaging members for driving said aligned axles, and means for sliding said differential axially far enough to bring one axle-engaging member thereof into operative engagement with both axles.

7. In a device of the class described, aligned drive gears, a differential having a peripheral gear mounted to slide into mesh with either drive gear or into a neutral position between them, axles having engagement with said differential, and means for supporting said differential and axles.

8. In a device of the class described, aligned drive gears, a differential having a peripheral gear mounted to slide into mesh with either drive gear or into a neutral position between them, axles having driving engagement with said differential, and means for supporting said differential and axles, said differential being slidable beyond the three positions above enumerated to bring either live axle drive member thereof into simultaneous engagement with both live axles.

9. In combination, a bevel pinion, a bevel gear in mesh therewith, a spur gear co-axial with said bevel gear and located between said bevel gear and the apex of its cone, and power-receiving means movable into and out of mesh with said spur gear.

10. In a device of the class described, a three-bevel nest, means for delivering power to one bevel, and two different means for delivering power from each of the other bevels, one of said two means comprising a shaft carrying said bevel and extending away from said nest for connection to a transmission, and the other means comprising a gear inside the nest carried by the bevel and receiving gear means movable into and out of mesh therewith.

11. In a device of the class described, in combination, a three bevel nest, individual shafts carrying all three bevels, spur gears carried by the end bevels, and means for deriving rotation therefrom, said means being slidable on a parallel spaced axis for meshing with either spur gear.

12. In a device of the class described, in combination, a three bevel nest, individual shafts carrying all three bevels, spur gears integral with the end bevels and between the same, and power take-off means slidable on a parallel spaced axis for selective meshing engagement with said gears.

13. In a device of the class described, in combination, a three bevel nest, individual shafts carrying all three bevels, spur gears integral with two end bevels, power take-off means slidable on a parallel spaced axis for selective meshing engagement with said gears.

14. In a device of the class described, a bevel nest, spur pinions connected with the aligned bevels, a differential, a peripheral spur gear on said differential, and means for displacing said differential to bring said gear into mesh with a pinion.

15. In combination, a bevel nest, spur pinions connected with the aligned bevels, and a differential having a ring gear adapted to mesh with either one of said spur pinions but only one at a time.

16. In a device of the class described, a drive gear, aligned gears driven simultaneously in opposite directions by said drive gear, a power receiving device including a differential slidable on an axis offset from that of the aligned gears, and means for sliding said receiving device into position to be driven by either aligned gear.

17. In combination, a pair of spur pinions driven simultaneously in opposite directions, a shaft parallel to the axis of said pinions, shiftable gear means adapted to mesh with either of said pinions, and a differential within said gear and operatively connected to a drive element.

18. In combination, a pair of spur pinions driven simultaneously in opposite directions, a shaft parallel to the axis of said pinions, shiftable gear means adapted to mesh with either of said pinions, one at a time, and a differential incorporated within said gear and having operative connection with a pair of shafts.

19. In a device of the class described, a bevel nest, a differential, and means cooperative between the bevel nest and differential upon sliding said differential to be driven in either direction from said bevel nest.

20. In combination, a three bevel nest, means associated with one of the bevels for driving the nest, a pair of power take-off means associated with each of the other bevels, one being inside the nest and the other outside the nest, and differential means movable into operative engagement with both of said power take-off means inside of the said bevel nest.

21. In combination, a three bevel nest, means associated with one of the bevels for driving the nest, a power take-off means associated with each of the other two bevels disposed inside of the nest, and differential means movable into engagement with both of said take-off means inside of the bevel nest.

22. In combination, a pair of driven elements, a differential having a pair of members for driving said elements, and means for causing a movement between the differential and the said elements to bring one of said members into operative engagement with both of said elements.

23. In combination, a pair of aligned shafts, a differential having shaft engaging members for driving said aligned shafts, and means for causing a movement between the differential and the said shafts to bring one shaft engaging member into operative engagement with both shafts.

24. In combination, a pair of aligned shafts, a differential associated therewith, a plurality of driving means, and means for moving the said differential on the said shafts into and out of engagement with each of the said driving means.

25. In combination, a pair of aligned shafts, a differential associated therewith, a plurality of driving means, and means for moving the said differential on the said shafts into and out of engagement with each of the said driving means, one of the members comprising said differential being movable into operative engagement with both of the said shafts.

In witness whereof, I hereunto subscribe my name this 18 day of January, 1922.

THOMAS L. FAWICK.